(12) United States Patent
Enjoji et al.

(10) Patent No.: US 7,078,116 B2
(45) Date of Patent: Jul. 18, 2006

(54) METHOD OF WARMING UP FUEL CELL SYSTEM

(75) Inventors: Naoyuki Enjoji, Utsunomiya (JP); Kazuya Sasamoto, Haga-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 416 days.

(21) Appl. No.: 10/696,415

(22) Filed: Oct. 28, 2003

(65) Prior Publication Data

US 2004/0091755 A1    May 13, 2004

(30) Foreign Application Priority Data

Oct. 31, 2002    (JP)    ............... 2002-318558

(51) Int. Cl.
*H01M 8/00*    (2006.01)
(52) U.S. Cl. ........................................ 429/13
(58) Field of Classification Search ............... 429/12, 429/13
See application file for complete search history.

(56) References Cited

U.S. PATENT DOCUMENTS 5,798,186 A    8/1998    Fletcher et al. ............... 429/13

FOREIGN PATENT DOCUMENTS

| JP | 2003-308863 | * | 10/2003 |
| JP | 2004-281219 | * | 10/2004 |
| JP | 2004-288530 | * | 10/2004 |
| JP | 2005-050638 | * | 2/2005 |

* cited by examiner

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano, Esq.

(57) ABSTRACT

A fuel cell system includes a fuel cell, a heater provided in the fuel cell, a load such as a peripheral component of the fuel cell, a capacitor, and a switch. Power generation of the fuel cell is carried out continuously for supplying electric energy to the load, and charging the capacitor. When charging of the capacitor is completed, the switch is operated such that electric energy discharged from the capacitor is supplied to the heater for warming up the fuel cell by the heater.

6 Claims, 10 Drawing Sheets

METHOD OF WARMING UP FUEL CELL SYSTEM

BACKGROUND OF THE INVENTION

1. Field of the Invention

The present invention relates to a method of warming up a fuel cell system including a fuel cell, a heater for heating the fuel cell, and a capacitor electrically connected to the fuel cell. The fuel cell includes an electrolyte electrode assembly interposed between a pair of separators. The electrolyte electrode assembly includes a pair of electrodes, and an electrolyte interposed between the electrodes.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

If the fuel cell has a low temperature at the time of starting operation, power generation can not be performed efficiently. It takes considerable time to raise the temperature of the fuel cell to a desired temperature for power generation. In particular, if operation of the fuel cell is started at a temperature below zero (freezing temperature), water condensation is likely to occur due to the heat radiated outwardly from the fuel cell, and the water produced in the reaction of the fuel cell is not smoothly discharged from the fuel cell. Thus, the desired power generation performance of the fuel cell may not be achieved.

In an attempt to address the problem, the U.S. Pat. No. 5,798,186 discloses a fuel cell system in which a fuel cell stack is connected to an external electrical circuit, and the supply of electric current to the external electrical circuit from the fuel cell stack is commenced such that the temperature of the membrane electrode assembly exceeds the freezing temperature of water.

In the fuel cell system of the U.S. patent, the temperature of the entire fuel cell stack is raised by self-heating. If operation of the fuel cell stack is started at a low temperature, a large amount of heat energy is needed for warming up the entire fuel cell stack. If an electrical heater is used for warming up the fuel cell stack, a considerably long time is needed, and the electrical heater needs to have a considerably large electric capacity. In particular, if operation of the fuel cell stack is started at a temperature below the freezing temperature, the water produced in the fuel cell stack may be frozen undesirably in the gas diffusion layers or reactant gas passages, and the warming up operation may not be carried out continuously.

SUMMARY OF THE INVENTION

A general object of the present invention is to provide a method of warming up a fuel cell system in which the fuel cell system is warmed up reliably in a short period of time by a simple process, and operation of the fuel cell system can be started rapidly.

According to the present invention, electric energy is generated continuously in a fuel cell for supplying electric energy to a peripheral component of the fuel cell. Electric energy is supplied to a capacitor (energy storing device) for charging the capacitor. Electric energy discharged from the capacitor is supplied to a heater for warming up the fuel cell by the heater. Charging and discharging of the capacitor are repeated during the continuous operation of the fuel cell.

Thus, the fuel cell is self-heated in generating electric energy for the load of the peripheral component and the load for charging the capacitor. The fuel cell is warmed up rapidly by the continuous power generation. The capacitor is also warmed up rapidly while charging and discharging of the capacitor are carried out repeatedly. With the simple process, the fuel cell and the capacitor are warmed up reliably in a short period of time, and operation of the fuel cell system can be started efficiently at a low temperature. The fuel cell and the capacitor can function desirably even if operation of the fuel cell system is started at a low temperature. The reliable warming up operation ensures the desired functions of the components in the fuel cell system, and operation of the fuel cell system can be started desirably at a low temperature.

In one embodiment, first and second capacitors are arranged in parallel with each other, and selectively connectable to the fuel cell. When the fuel cell is connected to the first capacitor for charging the first capacitor, electric energy is discharged from the second capacitor, and supplied to the heater. When the fuel cell is connected to the second capacitor for charging the second capacitor, electric energy is discharged from the first capacitor, and supplied to the heater.

Electric energy is supplied alternately from the first and second capacitors to the heater for warming up the fuel cell. The heater is continuously operated for heating the fuel cell, and thus, the fuel cell is warmed up reliably in a short period of time.

In one embodiment, first and second fuel cells are arranged in parallel with each other. Warming up operation is controlled simply. After warming up operation is finished, the first and second fuel cells are electrically connected in series with each other, and the first and second capacitors are electrically connected in series with each other.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
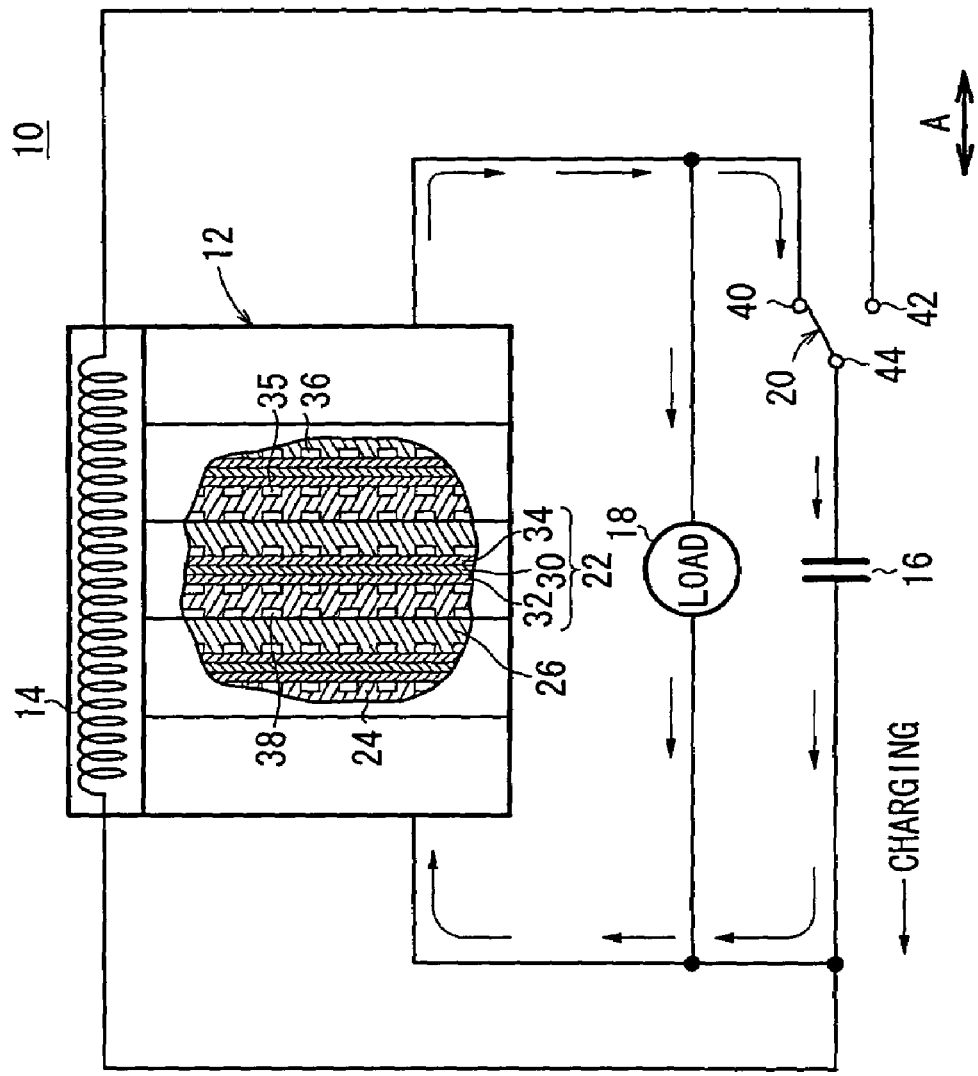
FIG. 1 is a view schematically showing a fuel cell system according to a first embodiment of the present invention.

FIG. 1 is a view schematically showing a fuel cell system 10 according to a first embodiment of the present invention.

The fuel cell system 10 includes at least one fuel cell 12, a heater 14 provided in the fuel cell 12 for heating the fuel cell 12, a capacitor (energy storing device) 16 electrically connected to the fuel cell 12, and a switch 20 for selectively connecting the capacitor 16 to the fuel cell 12 and the heater 14. In the embodiment, the fuel cell 12 is directly heated by the heater 14. Though not shown, a heater for heating a coolant may be used alternatively.

In FIG. 1, a plurality of fuel cells 12 are stacked together in a direction indicated by an arrow A to form a fuel cell stack. Alternatively, the fuel cell system 10 includes only a single fuel cell 12. The fuel cell 12 includes a membrane electrode assembly 22 and first and second separators 24, 26 for sandwiching the membrane electrode assembly 22. The membrane electrode assembly 22 comprises an anode 32, a cathode 34, and a solid polymer electrolyte membrane 30 interposed between the anode 32 and the cathode 34. The solid polymer electrolyte membrane 30 is formed by impregnating a thin membrane of perfluorosulfonic acid with water, for example.

Each of the anode 32 and the cathode 34 has a gas diffusion layer such as a porous carbon paper, and an electrode catalyst layer of platinum alloy supported on porous carbon particles. The carbon particles of the electrode catalyst layer are deposited uniformly on the surface of the gas diffusion layer. The electrode catalyst layer of the anode 32 and the electrode catalyst layer of the cathode 34 are fixed to both surfaces of the solid polymer electrolyte membrane 30, respectively.

The first separator 24 has a fuel gas flow field 35 on its surface facing the membrane electrode assembly 22 for supplying a fuel gas such as a hydrogen-containing gas to the anode 32. The second separator 26 has an oxygen-containing gas flow field 36 on its surface facing the membrane electrode assembly 22 for supplying an oxygen-containing gas to the cathode 34. A coolant flow field 38 for supplying a coolant to cool the membrane electrode assembly 22 is formed between the first and second separators 24, 26.

The fuel cell 12 and a load 18 is connected in parallel with each other. One end of the fuel cell 12, and one end of the heater 14 is connected to one end of the capacitor 16. The other end of the fuel cell 12 is connected to a first contact 40 of a switch 20, and the other end of the heater 14 is connected to a second contact 42 of the switch 20. The other end of the capacitor 16 is connected to a common contact 44 of the switch 20. The common contact 44 is selectively connected to the first contact 40 and the second contact 42 for selectively connecting the capacitor 16 to the fuel cell 12 and the heater 14.

Figure 2:
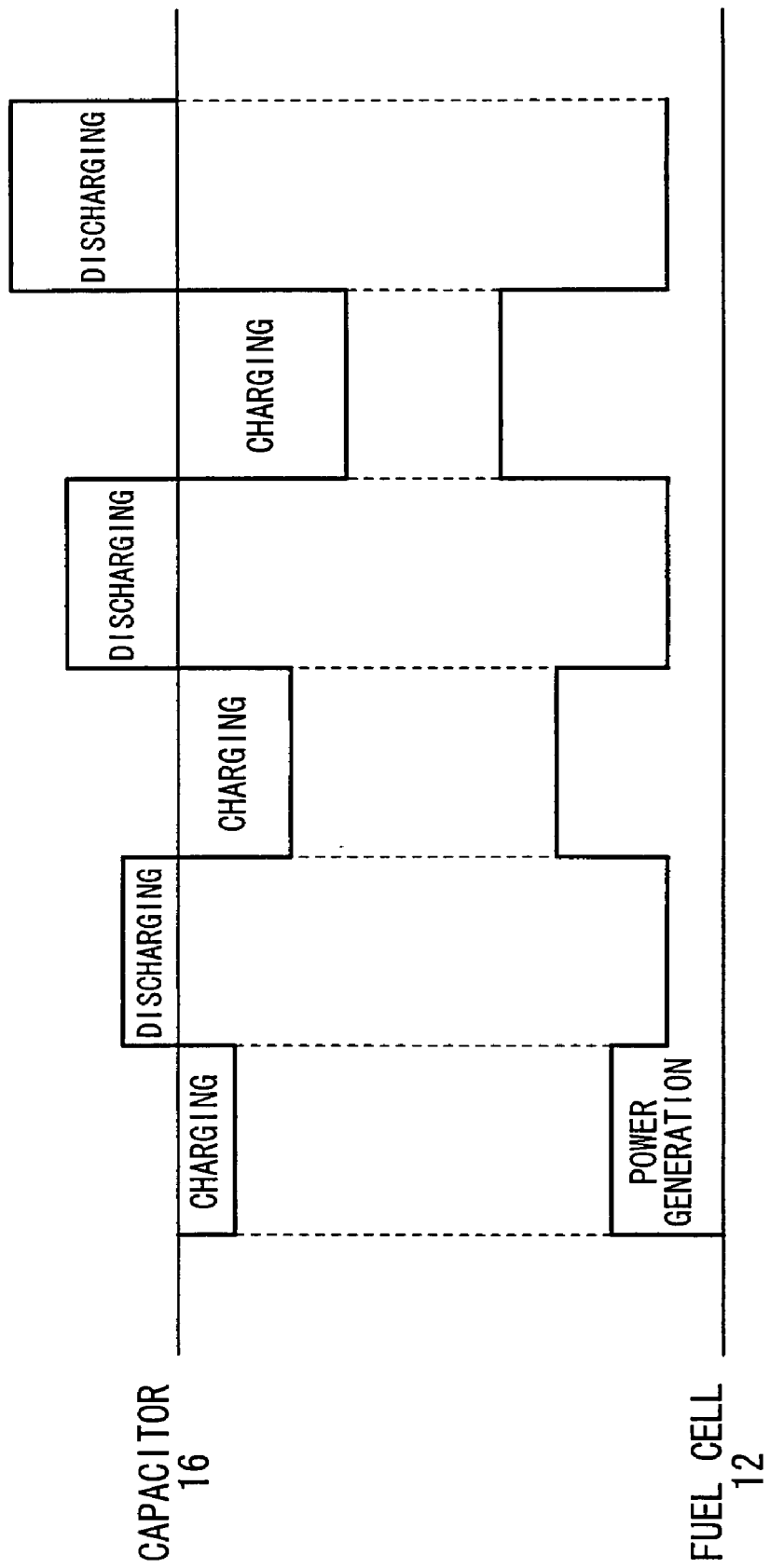
FIG. 2 is a timing chart showing operation of a fuel cell and a capacitor in the fuel cell system.
Figure 3:
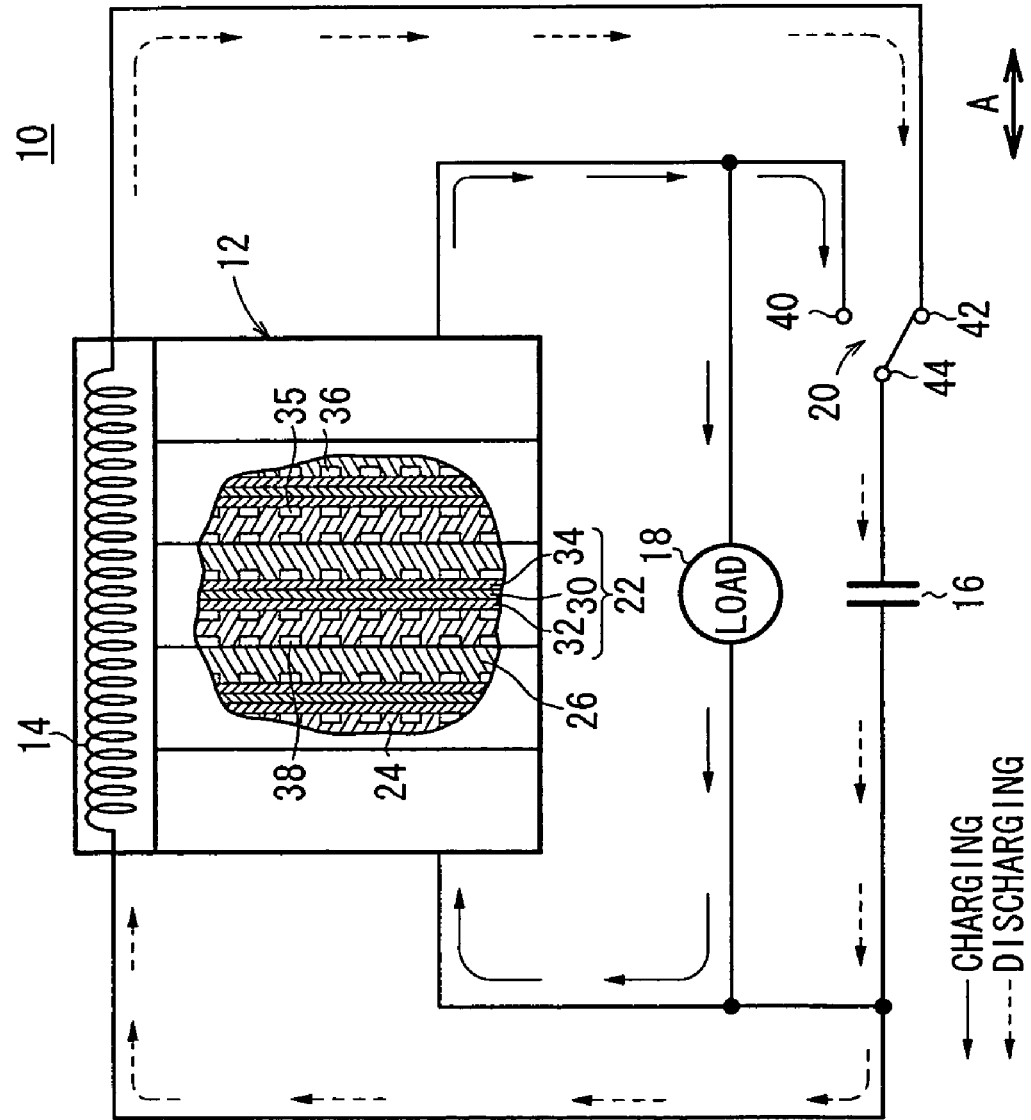
FIG. 3 is a view showing operation in which electric energy is discharged from the capacitor in the fuel cell system.

Operation of the fuel cell system 10 will be described below with reference to a timing chart shown in FIG. 2.

If operation of the fuel cell system 10 is started at a temperature below the freezing point, for example, the condensed water may be frozen undesirably during the operation. Thus, it is necessary to warm up the fuel cell system 10. In FIG. 1, the common contact 44 of the switch 20 is connected to the first contact 40. The capacitor 16 and the load 18 are electrically connected to the fuel cell 12. Under the condition, power generation of the fuel cell 12 is performed.

Specifically, a fuel gas such as a hydrogen-containing gas is supplied to the fuel gas flow field 35 on the first separator 24 for inducing an electrochemical reaction at the anode 32, and an oxygen-containing gas is supplied to the oxygen-containing gas flow field 36 on the second separator 26 for inducing an electrochemical reaction at the cathode 34. In the membrane electrode assembly 22, the fuel gas supplied to the anode 32, and the oxygen-containing gas supplied to the cathode 34 are consumed in the electrochemical reactions at the electrode catalyst layers of the anode 32 and the cathode 34 for generating electricity.

Further, a coolant heated by a heater (not shown) as necessary is supplied to the coolant flow field 38 between the first and second separators 24, 26. At the time of starting operation of the fuel cell 12, the temperature of the coolant is low. The supply of the coolant to the coolant flow field 38 may be stopped at the time of starting operation of the fuel cell 12 for preventing the fuel cell 12 from being cooled by the coolant undesirably.

As described above, when the capacitor 16 is connected electrically to the fuel cell 12 during power generation of the fuel cell 12, electric energy supplied from the fuel cell 12 is charged in the capacitor 16. Further, the fuel cell 12 supplies electric energy to the load 18 for driving periphery components of the fuel cell 12 such as a pump for supplying the fuel gas and a pump for supplying the oxygen-containing gas.

When electric charging of the capacitor 16 is completed, the switch 20 is operated to connect the common contact 44 to the second contact 42. Therefore, the capacitor 16 is disconnected from the fuel cell 12, and connected to the heater 14. Electric energy is discharged from the capacitor 16, and supplied to the heater 14. Thus, the heater 14 in the fuel cell 12 warms up the fuel cell 12.

When electric discharging of the capacitor 16 is completed, the switch 20 is operated to connect the common contact 44 to the first contact 40. Therefore, the capacitor 16 is disconnected from the heater 14, and connected to the fuel cell 12.

As describe above, switching operation of the switch 20 is carried out for repeating electric charging and discharging of the capacitor 16 alternately. The temperature of the heater 14 is raised to warm up the fuel cell 12. During the electric discharge period of the capacitor 16, power generation of the fuel cell 12 is performed continuously for supplying electric energy to the load 18.

In the first embodiment, the fuel cell 12 is self-heated in generating electric energy for the load 18 of the peripheral component and the load for charging the capacitor 16. The fuel cell 12 is warmed up rapidly by the continuous power generation. The capacitor 16 is also self-heated while charging and discharging of the capacitor are carried out repeatedly, and thus, the capacitor 16 is warmed up rapidly. With the simple process, the fuel cell 12 and the capacitor 16 are warmed up reliably in a short period of time, and operation of the fuel cell system 10 can be started rapidly at a low temperature.

If the fuel cell 12 and the capacitor 16 are operated for moving the vehicle, for example, before the fuel cell 12 and the capacitor 16 are warmed up sufficiently, the fuel cell 12 and the capacitor 16 do not function properly. As described above, the fuel cell 12 and the capacitor 16 according to the present embodiment can be warmed up reliably in a short period of time. Thus, the fuel cell system 10 using the fuel cell 12 and the capacitor 16 is capable of moving the vehicle with a high performance.

After warming up operation is completed, the switch 20 is operated to connect the common contact 44 to the first contact 40, and the fuel cell 12 is connected to the capacitor 16 (see FIG. 1).

Under the condition, the capacitor 16 is suitably utilized, typically, as an acceleration assisting component or a regenerative braking component.

Figure 4:
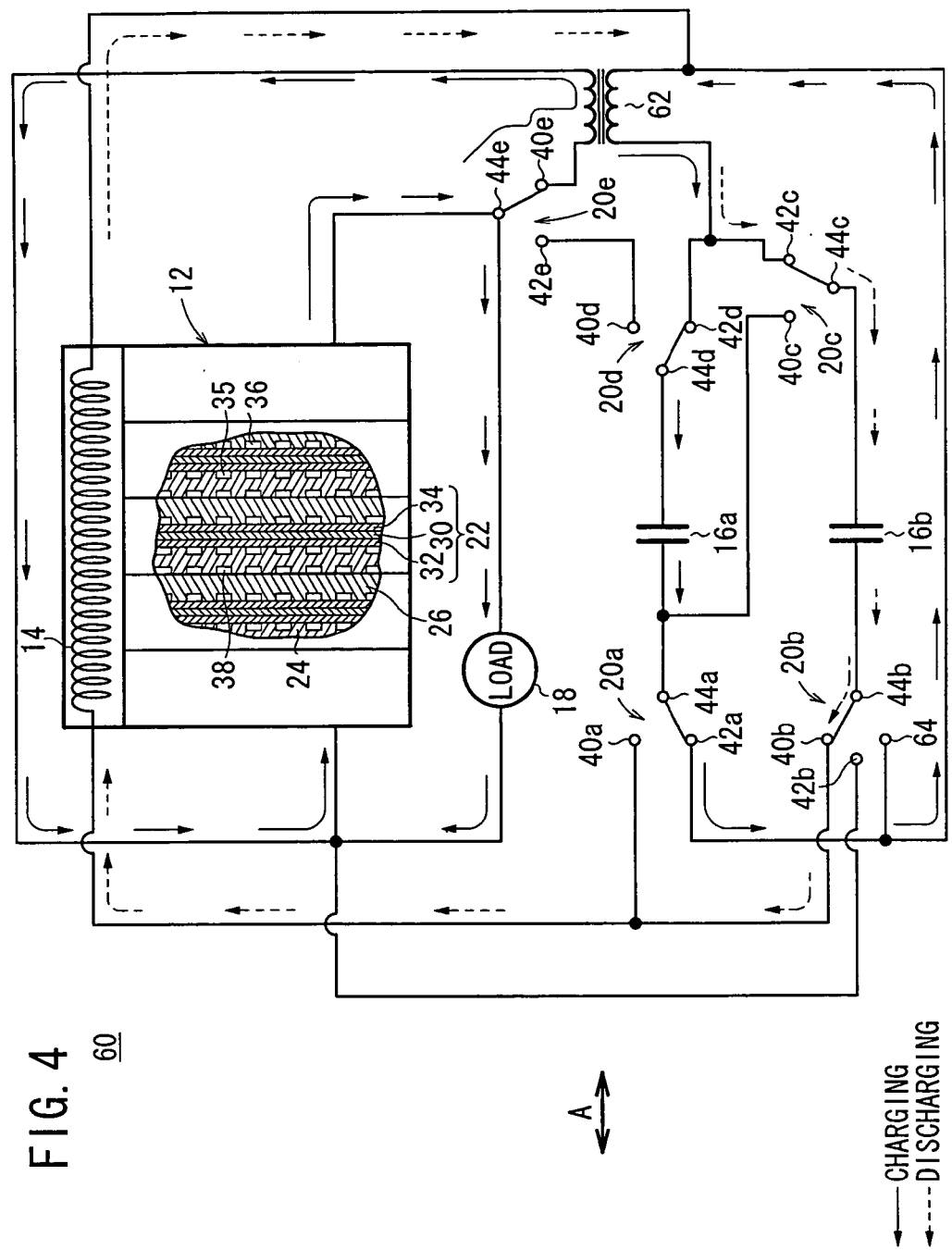
FIG. 4 is a view schematically showing a fuel cell system according to a second embodiment of the present invention.

FIG. 4 is a view schematically showing a fuel cell system 60 according to a second embodiment of the present invention. In FIG. 4, the constituent elements that are identical to those of the fuel cell system 10 according to the first embodiment are labeled with the same reference numeral, and description thereof is omitted.

The fuel cell system 60 includes first and second capacitors 16*a*, 16*b* arranged in parallel with each other, a transformer 62, and first through fifth switches 20*a*, 20*b*, 20*c*, 20*d*, 20*e*. When electric energy is charged in the first and second capacitors 16*a*, 16*b* alternately, the transformer 62 reduces the voltage applied to the first capacitor 16*a* or the second capacitor 16*b* by half.

The first switch 20*a* has a first contact 40*a* connected to the heater 14, a second contact 42*a* connected to the lower voltage side of the transformer 62, and a common contact 44*a* connected to the first capacitor 16*a*. The second switch 20*b* has a first contact 40*b* connected to the heater 14, a second contact 42*b* connected to the fuel cell 12, a third contact 64 connected to the lower voltage side of the transformer 62, and a common contact 44*b* connected to the second capacitor 16*b*.

The third switch 20*c* has a first contact 40*c* connected to the first capacitor 16*a*, and a second contact 42*c* connected to the lower voltage side of the transformer 62, and a common contact 44*c* connected to the second capacitor 16*b*. The fourth switch 20*d* has a first contact 40*d* connected to the fifth switch 20*e*, a second contact 42*d* connected to the lower voltage side of the transformer 62, and a common contact 44*d* connected to the first capacitor 16*a*.

The fifth switch 20*e* has a first contact 40*e* connected to the higher voltage side of the transformer 62, and a second contact 42*e* connected to the fourth switch 20*d*, and a common contact 44*e* connected to the fuel cell 12.

Figure 5:
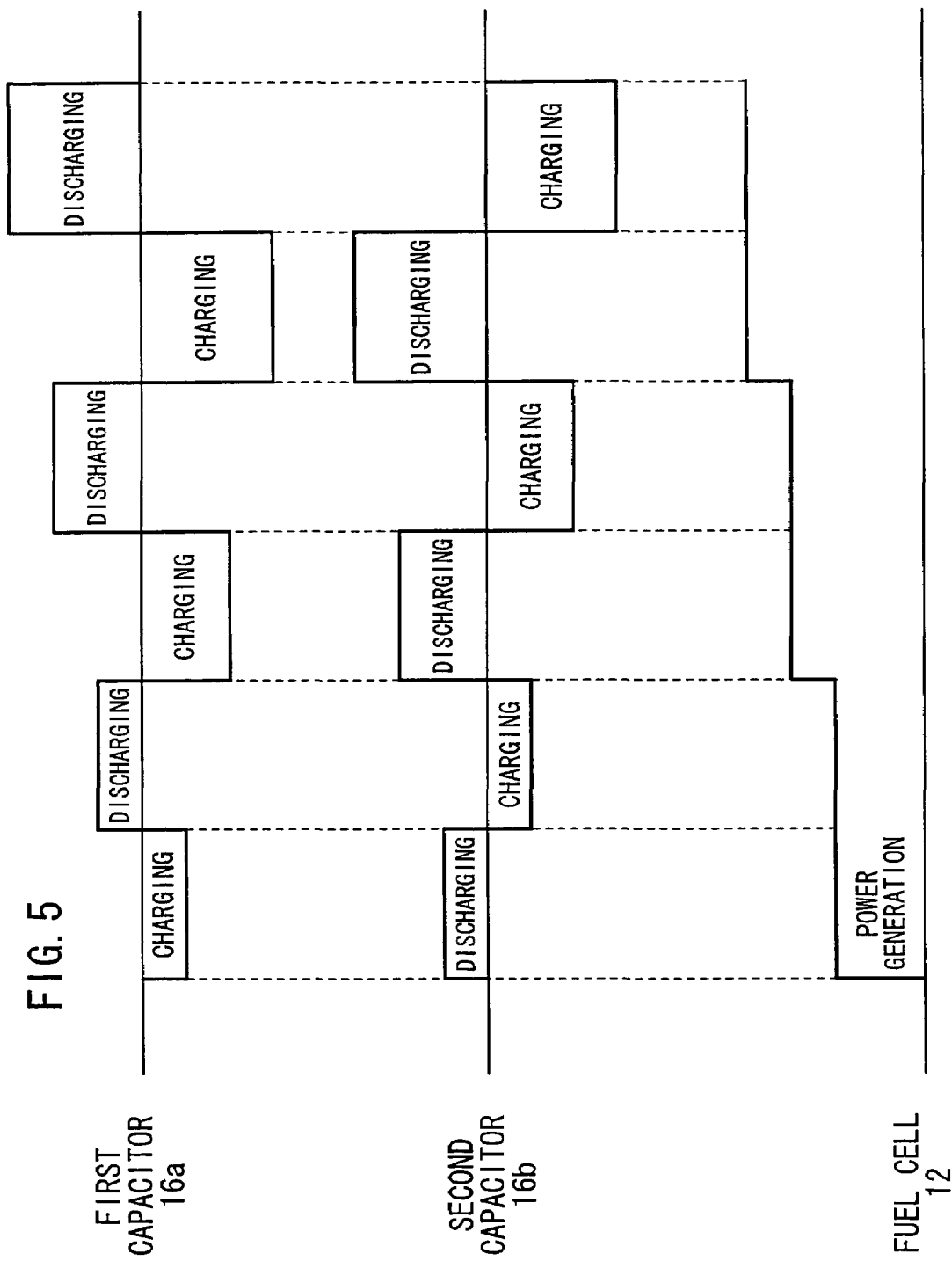
FIG. 5 is a timing chart showing operation of a fuel cell and first and second capacitors.

In the second embodiment, at the time of starting the operation of the fuel cell system 60 at a low temperature, the fuel cell 12, the first and second capacitors 16*a*, 16*b* are warmed up in a manner as shown in a timing chart shown in FIG. 5.

In FIG. 4, the common contact 44*a* of the first switch 20*a* is connected to the second contact 42*a*, the common contact 44*b* of the second switch 20*b* is connected to the first contact 40*b*, the common contact 44*c* of the third switch 20*c* is connected to the second contact 42*c*, the common contact 44*d* of the fourth switch 20*d* is connected to the second contact 42*d*, and the common contact 44*e* of the fifth switch 20*e* is connected to the first contact 40*e*.

When the power generation is performed in the fuel cell 12 for supplying electric energy to the load 18, the transformer 62 reduces the voltage of the fuel cell 12 by half, and applies the reduced voltage to the first capacitor 16*a* for charging the first capacitor 16*a*. The second capacitor 16*b* is electrically connected to the heater 14. Electric energy is discharged from the second capacitor 16*b*, and supplied to the heater 14. Thus, the fuel cell 12 is warmed up by the heater 14.

Figure 6:
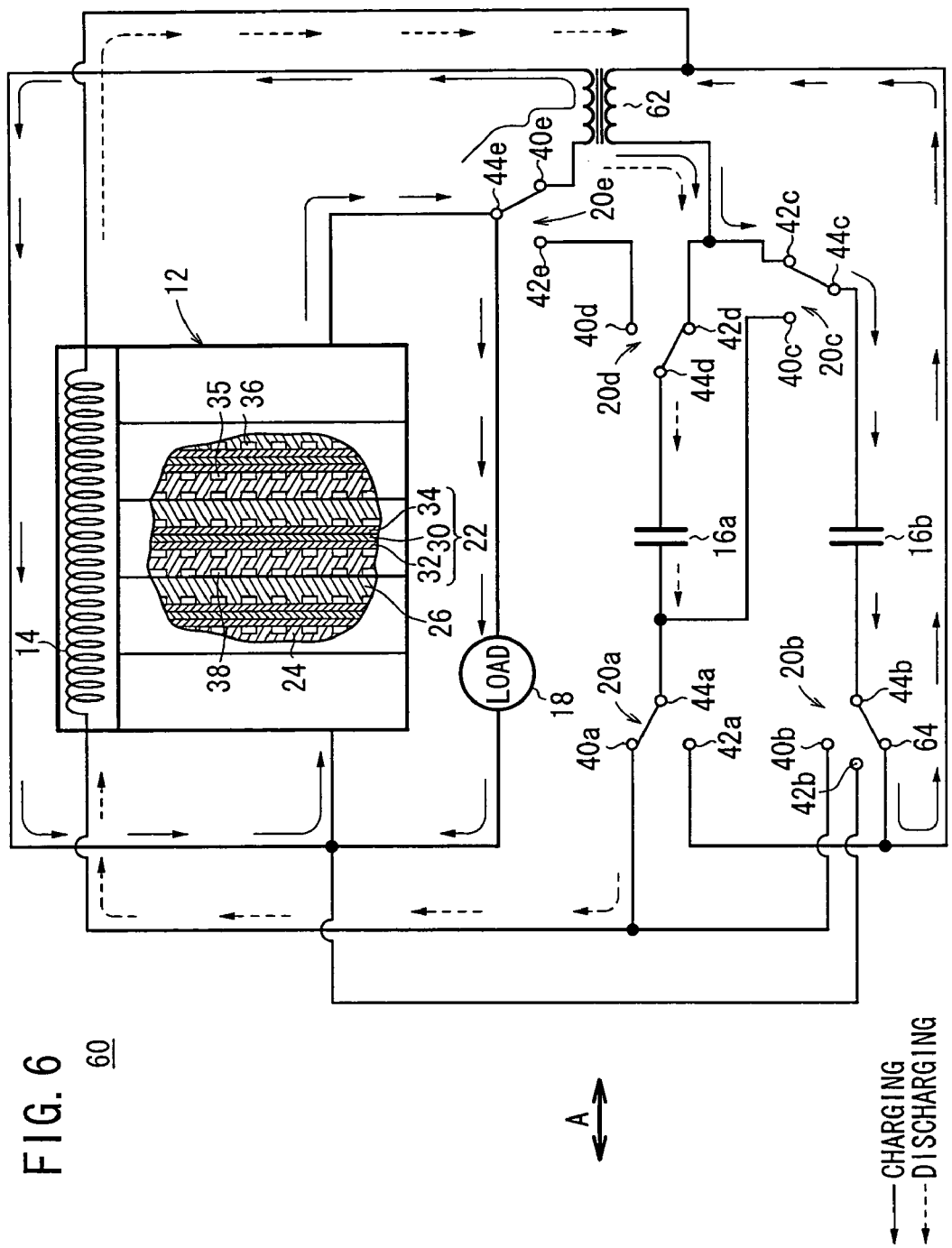
FIG. 6 is a view showing operation in which electric energy is discharged from the first capacitor, and electric energy is charged in the second separator.

Then, when charging of the first capacitor 16*a* and discharging of the second capacitor 16*b* are completed, electrical connections are changed by the first and second switches 20*a*, 20*b* as shown in FIG. 6. The first capacitor 16*a* is electrically connected to the heater 14 through the first and fourth switches 20*a*, 20*d*. Electric energy discharged from the first capacitor 16*a* is supplied to the heater 14, and the fuel cell 12 is warmed up continuously. The second capacitor 16*b* is connected to the lower voltage side of the transformer 62 through the second and third switches 20*b*, 20*c*. Electric energy from the fuel cell 12 is supplied to the second capacitor 16*b* for charging the second capacitor 16*b*.

When discharging of the first capacitor 16*a* and charging of the second capacitor 16*b* are completed, electrical connections are changed by the first and second switches 20*a*, 20*b* as shown in FIG. 4. Charging of the first capacitor 16*a* and discharging of the second capacitor 16*b* are started again, and the first and second capacitors 16*a*, 16*b* are warmed up.

Figure 7:
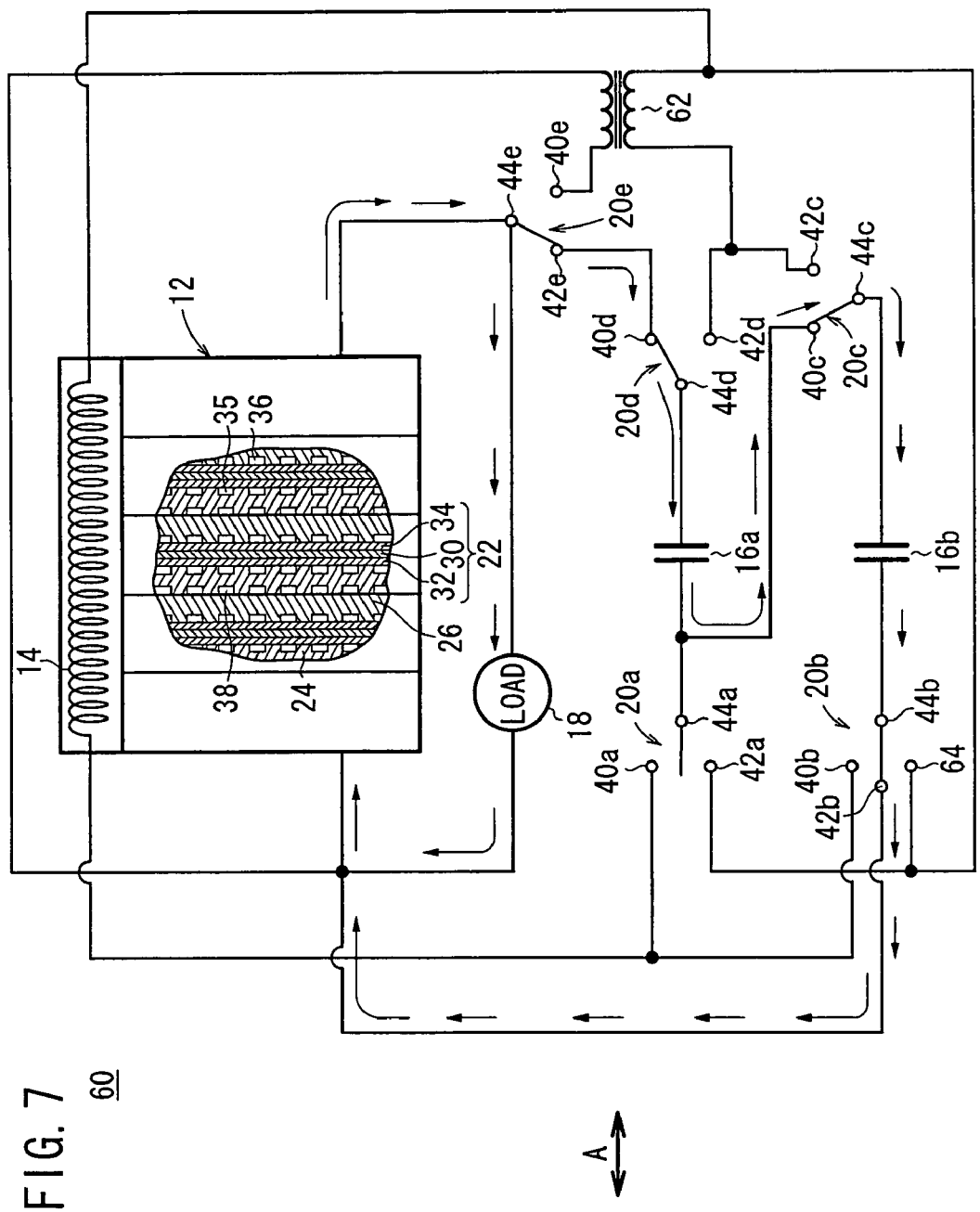
FIG. 7 is a view showing normal operation of the fuel cell system.

After the fuel cell 12 and the first and second capacitor 16*a*, 16*b* are warmed up as described above, electric connections are changed by the first through fifth switches 20*a* through 20*e* as shown in FIG. 7. The fuel cell 12, and the first and second capacitors 16*a*, 16*b* are connected in series to enter the normal operation mode.

In the second embodiment, the first and second capacitors 16*a*, 16*b* are arranged in parallel with each other, and selectively connected to the fuel cell 12 during the warming up operation. When the first capacitor 16*a* is connected to the fuel cell 12 for charging the first capacitor 16*a* by the fuel cell 12, the second capacitor 16*b* is connected to the heater 14, and electric energy discharged from the second capacitor 16*b* is supplied to the heater 14. Then, when the second capacitor 16*b* is connected to the fuel cell 12 for charging the second capacitor 16*b* by the fuel cell 12, the first capacitor 16*a* is connected to the heater 14, and electric energy discharged from the first capacitor 16*a* is supplied to the heater 14.

The first and second capacitors 16*a*, 16*b* are alternately discharged for supplying electric energy to the heater 14. Thus, electric energy is continuously supplied to the heater 14 for heating the fuel cell 12. Since the fuel cell 12 is self-heated by its power generating operation, and continuously heated by the heater 14, the fuel cell 12 is efficiently warmed up in a short period of time.

Figure 8:
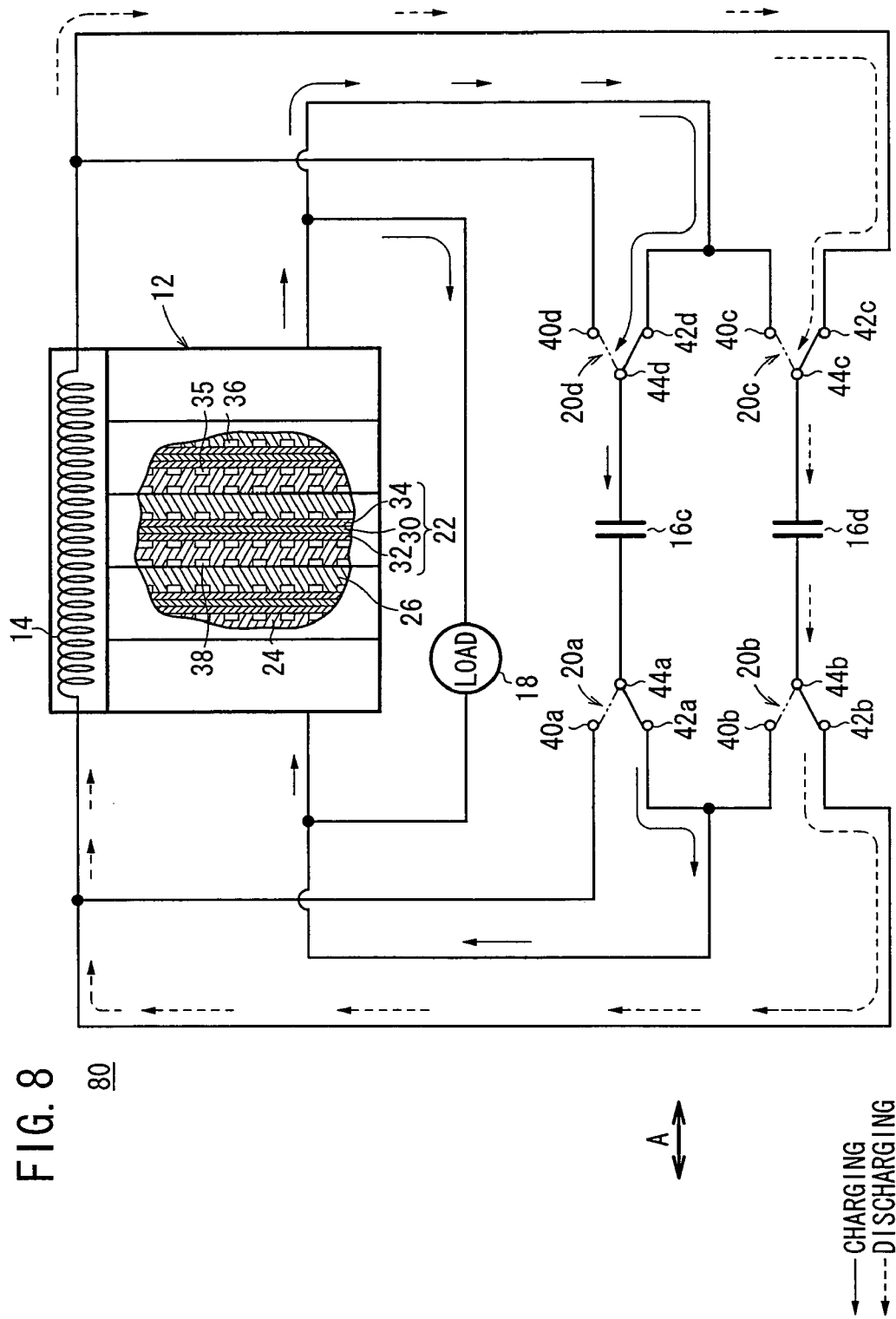
FIG. 8 is a view showing a fuel cell system according to a third embodiment of the present invention.

FIG. 8 is a view schematically showing a fuel cell system 80 according to a third embodiment of the present invention. In FIG. 8, the constituent elements that are identical to those of the fuel cell system 60 according to the first embodiment are labeled with the same reference numeral, and description thereof is omitted.

The fuel cell system 80 includes first and second capacitors 16*c*, 16*d*. The voltage applied to the first and second capacitors 16*c*, 16*d* is same as the voltage generated by the fuel cell 12. The first and second capacitors 16*c*, 16*d* are arranged in parallel with each other, and selectively connected to the fuel cell 12 through the first through fourth switches 20a through 20d. In the third embodiment, the transformer 62 and the fifth 20e of the fuel cell system 60 according to the second embodiment are not employed.

In the fuel cell system 80, the first through fourth switches 20a through 20d are operated as shown by solid lines in FIG. 8 in supplying electric energy of the fuel cell 12 to the first capacitor 16c for charging the first capacitor 16c, and supplying the energy discharged from the second capacitor 16d to the heater 14. Then, the first through fourth switches 20a through 20d are operated as shown by two-dot chain lines in FIG. 8 in supplying electric energy of the fuel cell 12 to the second capacitor 16d for charging the second capacitor 16d, and supplying electric energy discharged from the first capacitor 16c to the heater 14.

In the third embodiment, the fuel cell system 80 has a simple structure, and controlled simply. Electric energy is continuously supplied from the first and second capacitors 16c, 16d to the heater 14. Thus, the fuel cell 12 can be warmed up efficiently in a short period of time, as with the first and second embodiments.

Figure 9:
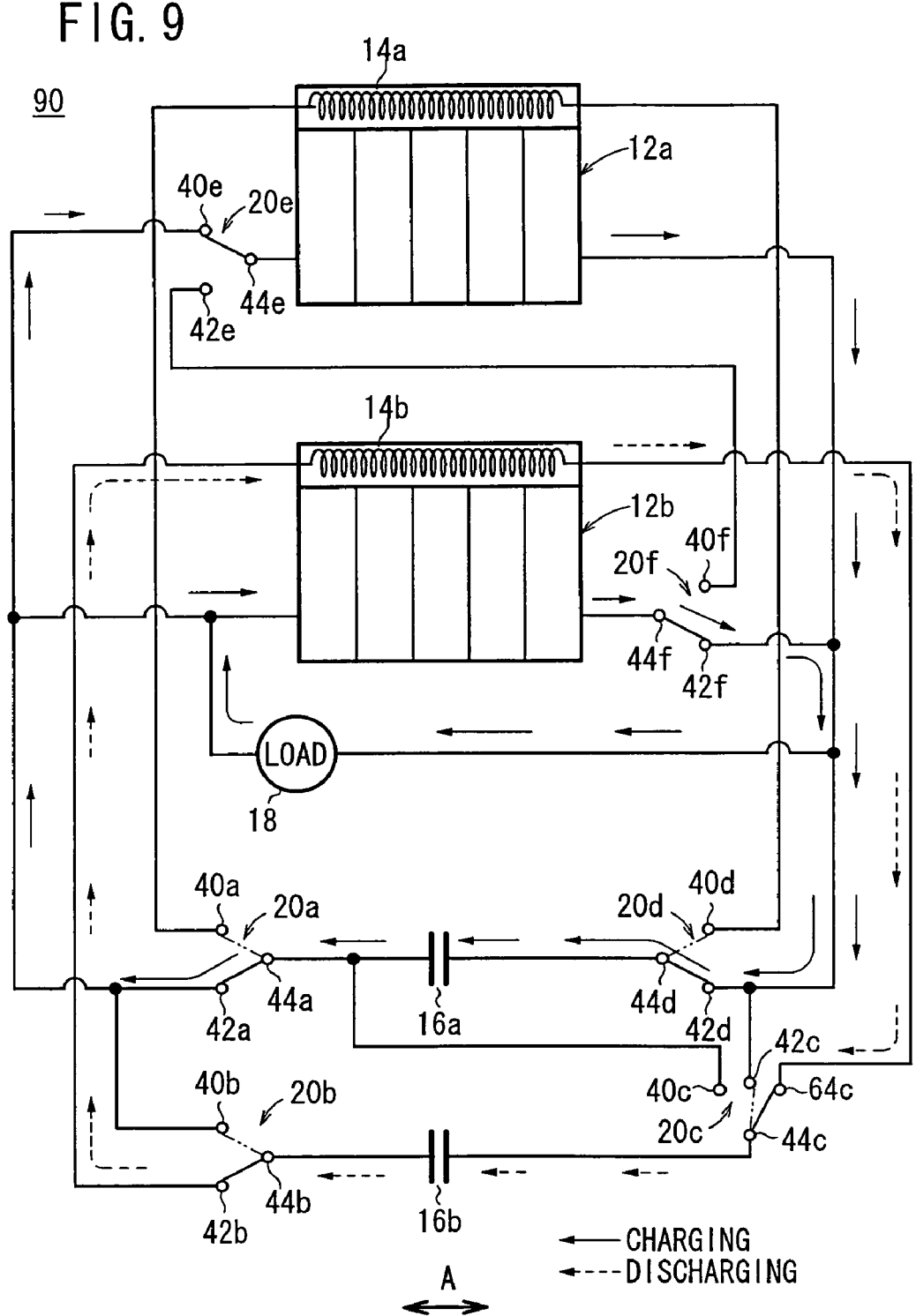
FIG. 9 is a view showing a fuel cell system according to a fourth embodiment of the present invention.

FIG. 9 is a view schematically showing a fuel cell system 90 according to a fourth embodiment of the present invention. In FIG. 9, the constituent elements that are identical to those of the fuel cell system 80 according to the third embodiment are labeled with the same reference numeral, and description thereof is omitted.

The fuel cell system 90 includes first and second fuel cells 12a, 12b. The first and second fuel cells 12a, 12b are connected in parallel with each other during warming up operation. A first heater 14a is provided in the first fuel cell 12a, and a second heater 14b is provided in the second fuel cell 12b. Fifth and sixth switches 20e, 20f are used for selectively connecting the first and second fuel cells 12a, 12b in parallel or in series.

The fifth switch 20e has a common contact 44e connected to the first fuel cell 12a, a first contact 40e connected to the first switch 20a, and a second contact 42e connected to the sixth switch 20f. The sixth switch 20f has a first contact 40f connected to the fifth switch 20e, a second contact 42f connected to the third and fourth switches 20c, 20d, and a common contact 44f connected to the second fuel cell 12b. The third switch 20c has a third contact 64c connected to the second heater 14b, in addition to the first and second contacts 40c, 42c.

In the fourth embodiment, when operation of the fuel cell system 90 is started at a low temperature, the first through sixth switches 20a through 20f are operated as shown by solid lines in FIG. 9. Electric energy generated by the first and second fuel cells 12a, 12b is supplied to the load 18. Further, electric energy is supplied to the first capacitor 16a for charging the first capacitor 16a. The second capacitor 16b is connected to the second heater 14b, and electric energy discharged form the second capacitor 16b is supplied to the second heater 14b for warming up the second fuel cell 12b.

When charging of the first capacitor 16a and discharging of the second capacitor 16b are completed, the first through fourth switches 20a through 20d are operated as shown by two dot lines in FIG. 9 for changing electrical connections. Electric energy generated by the first and second fuel cells 12a, 12b is supplied to the second capacitor 16b for charging the second capacitor 16b. The first capacitor 16a is connected to the first heater 14a, and electric energy discharged form the first capacitor 16a is supplied to the first heater 14a for warming up the first fuel cell 12a.

The first and second capacitors 16a, 16b are charged and discharged alternately and repeatedly by the switching operation of the first through fourth switches 20a through 20d. The first and second fuel cells 12a, 12b are self-heated during the power generation, and also heated by the heaters 14a, 14b, respectively. The first and second capacitors 16a, 16b are self-heated while the first and second capacitors 16a, 16b are charged and discharged repeatedly.

The fuel cell system 90 has a simple structure, and operation of the fuel cell system 90 is controlled simply. The first and second fuel cells 12a, 12b, and the first and second capacitors 12a, 12b are warmed up efficiently in a short period of time, as with the first through third embodiments.

Figure 10:
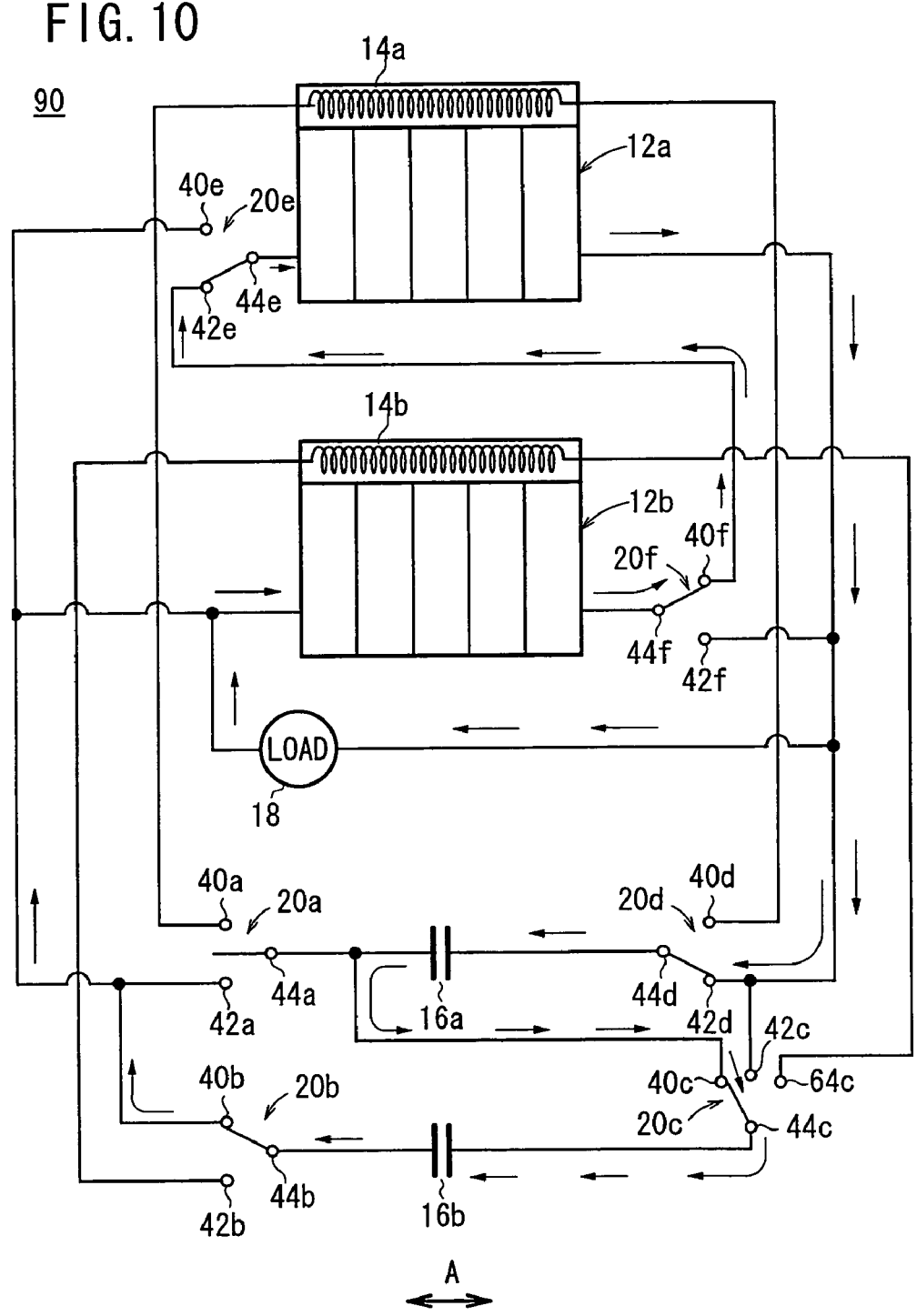
FIG. 10 is a view showing normal operation of the fuel cell system.

In the fourth embodiment, the first through sixth switches 20a through 20f are operated as shown in FIG. 10 during the normal operation. The first and second fuel cells 12a, 12b are connected in series with each other for generating a desired voltage, and the first and second capacitors 16a, 16b are connected in series with each other for use as, typically, acceleration assisting components or regenerative braking components.

In the method of warming up a fuel cell system according to the present invention, electric energy is generated continuously in a fuel cell for supplying electric energy to a peripheral component of the fuel cell. Electric energy is supplied to a capacitor for charging the capacitor. Electric energy discharged from the capacitor is supplied to a heater for warming up the fuel cell by the heater. Charging and discharging of the capacitor are repeated during the continuous operation of the fuel cell.

Thus, the fuel cell is self-heated in generating electric energy for the load of the peripheral component and the load for charging the capacitor. The fuel cell is warmed up rapidly by the continuous power generation. The capacitor is also warmed up rapidly while charging and discharging of the capacitor are carried out repeatedly. With the simple process, the fuel cell and the capacitor are warmed up reliably in a short period of time, and operation of the fuel cell system can be started efficiently at a low temperature.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of warming up a fuel cell system including a fuel cell, a heater for heating said fuel cell, and a capacitor electrically connected to said fuel cell, said fuel cell comprising an electrolyte electrode assembly including a pair of electrodes and an electrolyte interposed between said electrodes, and separators for sandwiching said electrolyte electrode assembly, said method comprising the steps of:
generating electric energy continuously in said fuel cell for supplying electric energy to a peripheral component of said fuel cell;
supplying electric energy to said capacitor for charging said capacitor; and
supplying electric energy discharged from said capacitor to said heater for warming up said fuel cell by said heater,
wherein charging and discharging of said capacitor are repeated during the continuous operation of said fuel cell.

2. A warming up method according to claim 1, wherein said capacitor includes first and second capacitors arranged in parallel with each other, and selectively connectable to said fuel cell;

said method comprising the steps of:
connecting said fuel cell and said first capacitor for charging said first capacitor while supplying electric energy discharged from said second capacitor to said heater; and
connecting said fuel cell and said second capacitor for charging said second capacitor while supplying electric energy discharged from said first capacitor to said heater.

3. A warming up method according to claim 2, wherein said first and second capacitors are connectable to said fuel cell through a transformer; and
a voltage generated by said fuel cell is reduced by half by said transformer, and applied alternately to said first and second capacitors for charging said first and second capacitors.

4. A warming up method according to claim 2, wherein after warming up operation is finished, said first and second capacitors are electrically connected in series with each other.

5. A warming up method according to claim 2, wherein said fuel cell includes first and second fuel cells arranged in parallel with each other, and said heater includes a first heater for heating said first fuel cell and a second heater for heating said second fuel cell, said method comprising the steps of:
connecting said first and second fuel cells and said first capacitor for charging said first capacitor while supplying electric energy discharged from said second capacitor to said second heater for warming up said second fuel cell; and
connecting said first and second fuel cells and said second capacitor for charging said second capacitor while supplying electric energy discharged from said first capacitor to said first heater for warming up said first fuel cell.

6. A warming up method according to claim 5, wherein after warming up operation is finished, said first and second fuel cells are electrically connected in series with each other, and said first and second capacitors are electrically connected in series with each other.

* * * * *